(12) United States Patent
Chandrasekaran et al.

(10) Patent No.: US 8,312,135 B2
(45) Date of Patent: Nov. 13, 2012

(54) COMPUTING SYSTEM INFRASTRUCTURE TO ADMINISTER DISTRESS MESSAGES

(75) Inventors: Nirupama Chandrasekaran, Seattle, WA (US); Gopal Parupudi, Issaquah, WA (US); Prabhu Padhi, Sammamish, WA (US); Ben Yim, Duvall, WA (US); Atif Gul, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 11/670,838

(22) Filed: Feb. 2, 2007

(65) Prior Publication Data
US 2008/0189369 A1    Aug. 7, 2008

(51) Int. Cl.
*G06F 15/173* (2006.01)
(52) U.S. Cl. ......... 709/224; 709/200; 709/206; 709/223
(58) Field of Classification Search .................. 709/206, 709/223, 224
See application file for complete search history.

(56) References Cited

U.S. PATENT DOCUMENTS

| | | | | |
|---|---|---|---|---|
| 5,287,448 A * | 2/1994 | Nicol et al. | ..... | 715/707 |
| 5,872,926 A * | 2/1999 | Levac et al. | ..... | 709/206 |
| 5,878,224 A * | 3/1999 | Smith | ..... | 709/224 |
| 6,269,460 B1 * | 7/2001 | Snover | ..... | 714/48 |
| 6,442,713 B1 * | 8/2002 | Block et al. | ..... | 714/43 |
| 6,522,635 B1 * | 2/2003 | Bedwell | ..... | 370/314 |
| 6,574,605 B1 * | 6/2003 | Sanders et al. | ..... | 705/7.26 |
| 6,738,811 B1 * | 5/2004 | Liang | ..... | 709/224 |
| 6,779,022 B1 * | 8/2004 | Rothkopf et al. | ..... | 709/206 |
| 6,792,081 B1 | 9/2004 | Contractor | | |
| 6,804,714 B1 * | 10/2004 | Tummalapalli | ..... | 709/224 |
| 6,829,247 B1 * | 12/2004 | Corkum et al. | ..... | 370/465 |
| 6,874,099 B1 * | 3/2005 | Balasubramanian et al. | . | 714/4.1 |
| 6,915,341 B2 * | 7/2005 | McGee et al. | ..... | 709/223 |
| 6,918,051 B2 * | 7/2005 | Block et al. | ..... | 714/4 |
| 7,017,071 B2 * | 3/2006 | Katayama et al. | ..... | 714/4 |
| 7,080,141 B1 | 7/2006 | Baekelmans et al. | | |
| 7,106,467 B2 * | 9/2006 | Takahashi | ..... | 358/1.15 |
| 7,162,014 B2 * | 1/2007 | Skladman et al. | ..... | 379/88.13 |
| 7,209,963 B2 * | 4/2007 | Burton et al. | ..... | 709/223 |
| 7,246,156 B2 * | 7/2007 | Ginter et al. | ..... | 709/217 |
| 7,343,364 B2 * | 3/2008 | Bram et al. | ..... | 706/47 |
| 7,380,171 B2 * | 5/2008 | Prescott et al. | ..... | 714/38 |
| 7,401,143 B2 * | 7/2008 | Oulu et al. | ..... | 709/224 |
| 7,467,196 B2 * | 12/2008 | Di Luoffo et al. | ..... | 709/223 |
| 7,620,707 B1 * | 11/2009 | Sutherland et al. | ..... | 709/223 |
| 2002/0095269 A1 * | 7/2002 | Natalini et al. | ..... | 702/188 |
| 2003/0088693 A1 * | 5/2003 | Cheung et al. | ..... | 709/238 |
| 2003/0139174 A1 * | 7/2003 | Rao | ..... | 455/418 |

(Continued)

OTHER PUBLICATIONS

Darieby, et al., "Intelligent Mobile Agents: Towards Network Fault Management Automation", retrived on Aug. 28, 2006, at <<http://scholar.google.com/scholar?hl=en&lr=&q=cache:nAasHN0XIEwJ:www.cse.iitb.ac.in/~porporwalpiyush/seminar/el-darieby99intelligent.ps+network+troubleshooting+message>>, pp. 1-16.

(Continued)

*Primary Examiner* — John Follansbee
*Assistant Examiner* — Anthony Mejia
(74) *Attorney, Agent, or Firm* — Lee & Hayes, PLLC (57) ABSTRACT

A system and method that allows for distress or SoS messages from various managed resources to be sent to a reliable location such as a server. The server can gather the distress messages and provide a summary or health status based on the gathered distress messages.

13 Claims, 5 Drawing Sheets

U.S. PATENT DOCUMENTS

| | | | |
|---|---|---|---|
| 2003/0210766 A1 | 11/2003 | Lin et al. | |
| 2003/0212928 A1 | 11/2003 | Srivastava et al. | |
| 2003/0236923 A1* | 12/2003 | Jeyaraman et al. | 709/318 |
| 2004/0010586 A1* | 1/2004 | Burton et al. | 709/224 |
| 2004/0073820 A1* | 4/2004 | Hsu | 713/300 |
| 2004/0199627 A1* | 10/2004 | Frietsch | 709/224 |
| 2005/0153688 A1* | 7/2005 | Burkhart et al. | 455/414.3 |
| 2005/0182834 A1* | 8/2005 | Black | 709/224 |
| 2005/0197112 A1 | 9/2005 | Yang et al. | |
| 2005/0245272 A1* | 11/2005 | Spaur et al. | 455/456.3 |
| 2006/0009243 A1 | 1/2006 | Dahan et al. | |
| 2006/0077053 A1 | 4/2006 | Park et al. | |
| 2006/0167828 A1 | 7/2006 | Di Luoffo et al. | |
| 2006/0167866 A1* | 7/2006 | Farchi et al. | 707/4 |
| 2006/0168239 A1 | 7/2006 | Gauthier | |
| 2006/0174341 A1 | 8/2006 | Judge | |
| 2006/0179355 A1 | 8/2006 | Bouchard | |
| 2006/0184714 A1 | 8/2006 | Dang et al. | |
| 2006/0212719 A1* | 9/2006 | Miyawaki et al. | 713/189 |
| 2006/0265459 A1* | 11/2006 | Petry et al. | 709/206 |
| 2007/0073820 A1* | 3/2007 | Chandhok et al. | 709/206 |
| 2007/0078978 A1* | 4/2007 | Arnold et al. | 709/224 |
| 2007/0233854 A1* | 10/2007 | Bukovec et al. | 709/224 |
| 2008/0005321 A1* | 1/2008 | Ma et al. | 709/224 |
| 2008/0162984 A1* | 7/2008 | Kalra et al. | 714/4 |
| 2009/0070458 A1* | 3/2009 | Fuse et al. | 709/224 |
| 2010/0064039 A9* | 3/2010 | Ginter et al. | 709/224 |

OTHER PUBLICATIONS

"Emergency Communication System", retrieved at <<https://www.verisign.com/stellent/groups/public/documents/data_sheet/002636.pdf>>, VeriSign, Apr. 25, 2005, pp.

* cited by examiner

COMPUTING SYSTEM INFRASTRUCTURE TO ADMINISTER DISTRESS MESSAGES

BACKGROUND

Communications systems today are moving rapidly from a hierarchical model to a modular distributed model. Resources, and particularly computing resources, can include cell phones, personal digital assistants (PDA), laptop computers, desktop computers, mobile communication devices, etc. Management of various resources in enterprise systems (e.g., corporate systems) is becoming more and more important, not only for data security reasons, but also to ensure compliance with existing financial and legal policies and to provide reliable services. Resource management includes monitoring health, pushing software, updating versions and handling other resource related issues. The resources are typically either remotely managed, and may employ an agent component at the resources or may be agentless. Typically, in an agent or agentless management of resources, a central server may be used to remotely monitor each entity and perform the management activities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an embodiment, distress states are identified at one or more resources and communicated to a dedicated location. The messages may be filtered, summarized, and reported to another location.

BRIEF DESCRIPTION OF DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to infrastructure to administer distress messages. The infrastructure capabilities enable various computing resources to transmit distress messages even in the absence of regular infrastructure and thereby help enterprises to reliably manage computing resources.

In one implementation, when a particular resource encounters any error or problem in any aspect, the particular resource may send a distress or SoS (i.e., common reference to a distress or help request) to a central location, such as a fallback status point (FSP) server through a dedicated channel or communication pipe. The FSP server may communicate the distress message to another location such as a central server, thereby notifying the central server that the particular resource requires troubleshooting assistance. In addition, the distress message may also identify the nature of the problem such as, for example, problems with connectivity, software installation, update, patching, etc.

Multiple and varied implementations and embodiments are described below. In the following section, an exemplary network environment that is suitable for practicing various implementations is described initially. After this discussion, representative implementations of systems, devices, and processes for implementing infrastructure to administer distress messages are described in the subsequent sections.

Exemplary Network Environment

Figure 1:
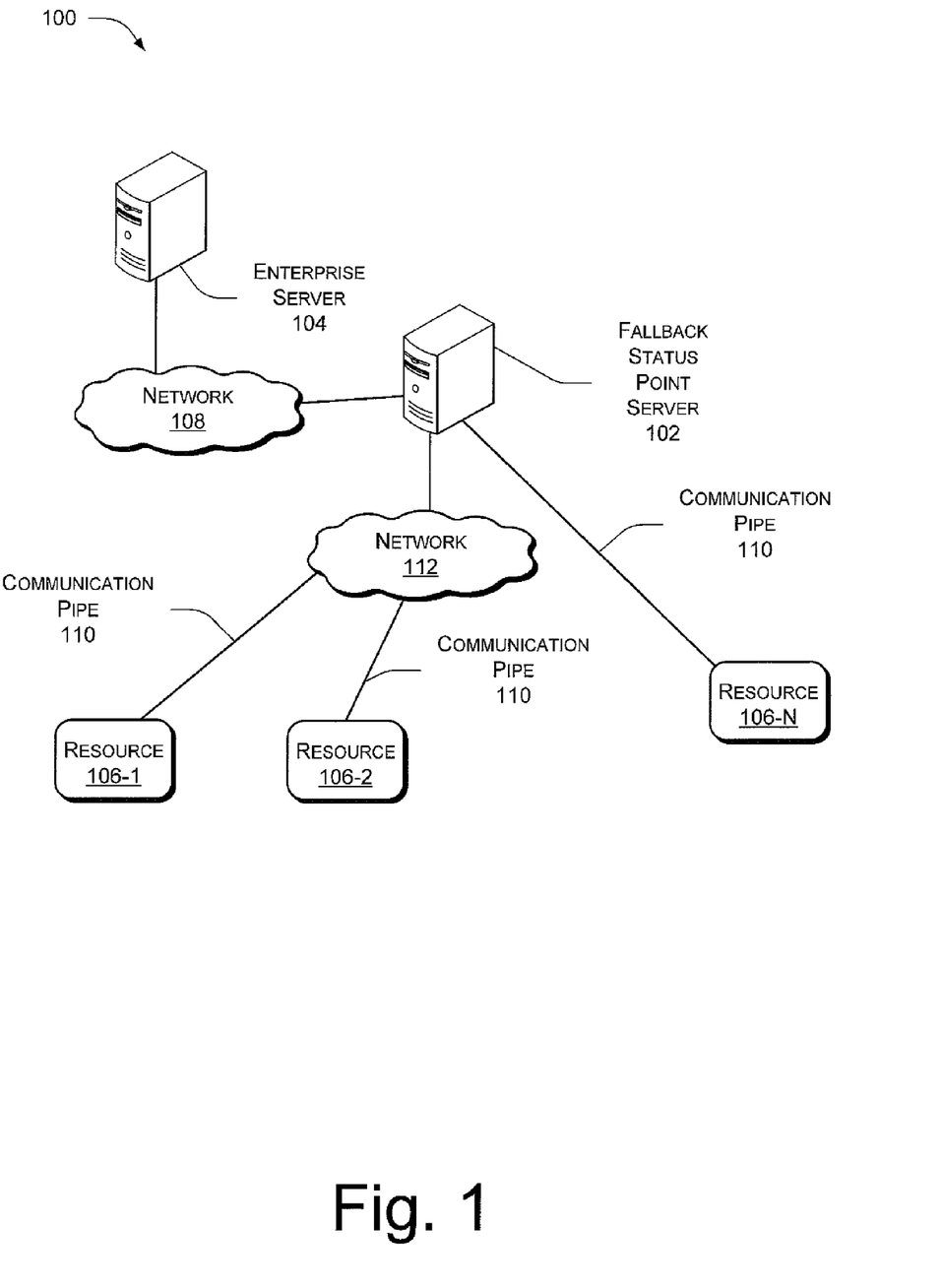
FIG. 1 illustrates an exemplary environment in which infrastructure to administer distress messages may be implemented.

FIG. 1 illustrates an exemplary network environment 100 that is suitable for implementing infrastructure to administer distress messages. For discussion purposes, in this exemplary embodiment, network environment 100 includes a fallback status point server (FSP server) 102 associated with one or more enterprise server 104 and one or more resources (106-1, 106-2, ... 106-N). The FSP server 102 acts as an intermediate server that can transmit messages between the enterprise server 104 and the resources 106. The FSP server 102 provides for receipt and gathering of distress messages from various resources 106. The FSP server 102 is expected to be continuously available and communicative to the resources 106 to receive distress messages. Further, the FSP server 102 provides for summarizing and/or analyzing the distress messages and propagating the distress messages to the enterprise server 104. The resources 106 include various resources that are managed by the enterprise server 104, such as cell phones, personal digital assistants (PDA), laptop computers, desktop computers, mobile communication devices, etc. Furthermore, resources 106 may implement or be considered as different system types (i.e., Internet machines, corporation net or intranet machines, etc.)

The FSP server 102 may communicate with the enterprise server 104 through a network 108. In addition, the FSP server 102 may communicate with the one or more resources 106 either directly via communication pipe 110 or through a network 112 via the communication pipe 110. The networks 108 and 112 can be a collection of individual networks, interconnected with each other and functioning as a single large network (e.g., the Internet or an intranet). Examples of such individual networks include, but are not limited to, Local Area Networks (LANs), Wide Area Networks (WANs), Metropolitan Area Networks (MANs), and cellular networks. Further, the networks 108 and 112 may be a wireless or a wired network, or a combination thereof.

In one implementation, when a resource 106 identifies an error or problem in any aspect, the resource 106 sends a distress message to the FSP server 102 through the communication pipe 110. The communication pipe 110 may enable the resource 106 to send the distress message without restrictions imposed by firewalls or other security measures. Further, the communication pipe 110 may enable the resource 106 to send the distress message even in the absence of other regular or usual communication infrastructure. The communication pipe 110 may be a dedicated channel that allows resources 106 and FSP server to continuous communicate with one another using a common communication protocol. Furthermore, a lightweight or reduced agent may be implemented at the resources 106 to allow such continuous or "always on" communication.

The distress message may relate to issues such as client installation, client assignment, client (mis)configuration, communication problems, etc. Further, the distress messages may relate to status messages that track client related matters such as installation, configuration and health and service related issues. The distress message may also define the nature of the problem, in addition to indicating that a problem exists. For example, when the resource 106 senses absence of a management tone (e.g., dial tone) used for monitoring by the enterprise server 104, the resource 106 may send a distress message to the FSP server 102. As another example, when the resource 106 senses that an agent deployed by the enterprise server 104 for monitoring or installation or for any other purpose is not healthy, the resource 106 may send a distress message to the FSP server 102. As yet another example, the resource 106 may be a cell phone at a remote location that encounters a problem with an application, and sends a distress message to the FSP server 102 to indicate the existence of the problem.

The FSP server 102 may propagate the distress message to the enterprise server 104. Thus the enterprise server 104 receives at least an indication that there is a problem with the resource 106. The enterprise server 104 or an administrator may then take appropriate action to determine and/or mitigate the problem. Exemplary architectures of the resource 106 and FSP server 102 are further described below with reference to FIG. 2 and FIG. 3 respectively.

Exemplary Resource

Figure 2:
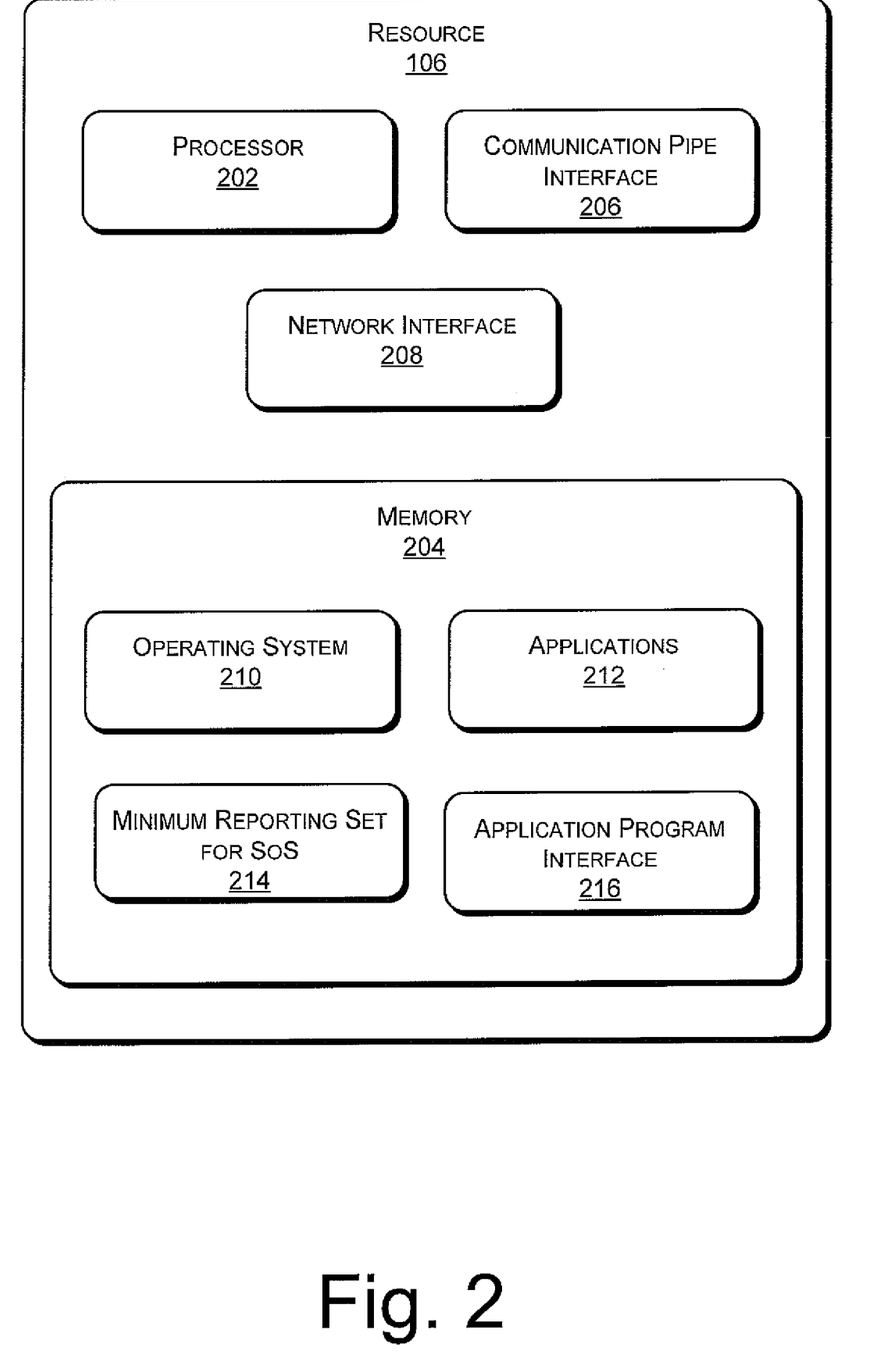
FIG. 2 is a block diagram illustrating an exemplary resource.

FIG. 2 is a block diagram illustrating an exemplary resource 106. The resource 106 includes a processor 202 coupled to a memory 204; and a communication pipe interface 206 and a network interface 208, coupled to the memory 204. The memory 204 includes computer-readable media in the form of volatile memory, such as Random Access Memory (RAM) and/or non-volatile memory, such as Read Only Memory (ROM) or flash RAM. Memory 204 typically includes data and/or program modules that are immediately accessible to and/or presently operated on by processor 202. In one embodiment, the memory 204 includes an operating system 210, applications 212, a minimum reporting set for distress messages 214 and an application program interface 216.

Whenever the resource 106 encounters a problem, the resource 106 may send a distress message indicating the existence of the problem via the communication pipe interface 206. The communication pipe interface 206 may use a lightweight communication protocol that enables the resource 106 to send distress messages, such as from startup of the resource 106 and in absence of other infrastructure (i.e., regular infrastructure).

The distress message may be generated on the occurrence of a problem using the minimum reporting set for distress messages 214. The minimum reporting set for distress messages 214 provides a library of messages to help generate the distress message. The minimum reporting set for distress messages 214 may be generic enough that any application may generate and send the distress message (that suits its application needs) via the communication pipe interface 206. For example, the minimum reporting set may help an application program generate a distress message in a mark up language such as XML, or text, or any other format. Further, the distress message may be transmitted using any of a variety of communication protocols, for example, TCP, HTTP, cellular protocols, etc. In addition, the resource 106 may also use an application program interface 216 to format and send the distress message.

Though FIG. 2 shows the minimum reporting set for distress messages 214 as residing on the resource 106, it will be understood that the minimum reporting set for distress messages 214 need not be hosted on the resource 106. For example, the minimum reporting set for distress messages 214 could also be hosted on a storage medium communicatively coupled to the resource 106. This includes the possibility of the minimum reporting set for distress messages 214 being hosted in whole, or in part, on the resource 106.

Exemplary FSP Server

Figure 3:
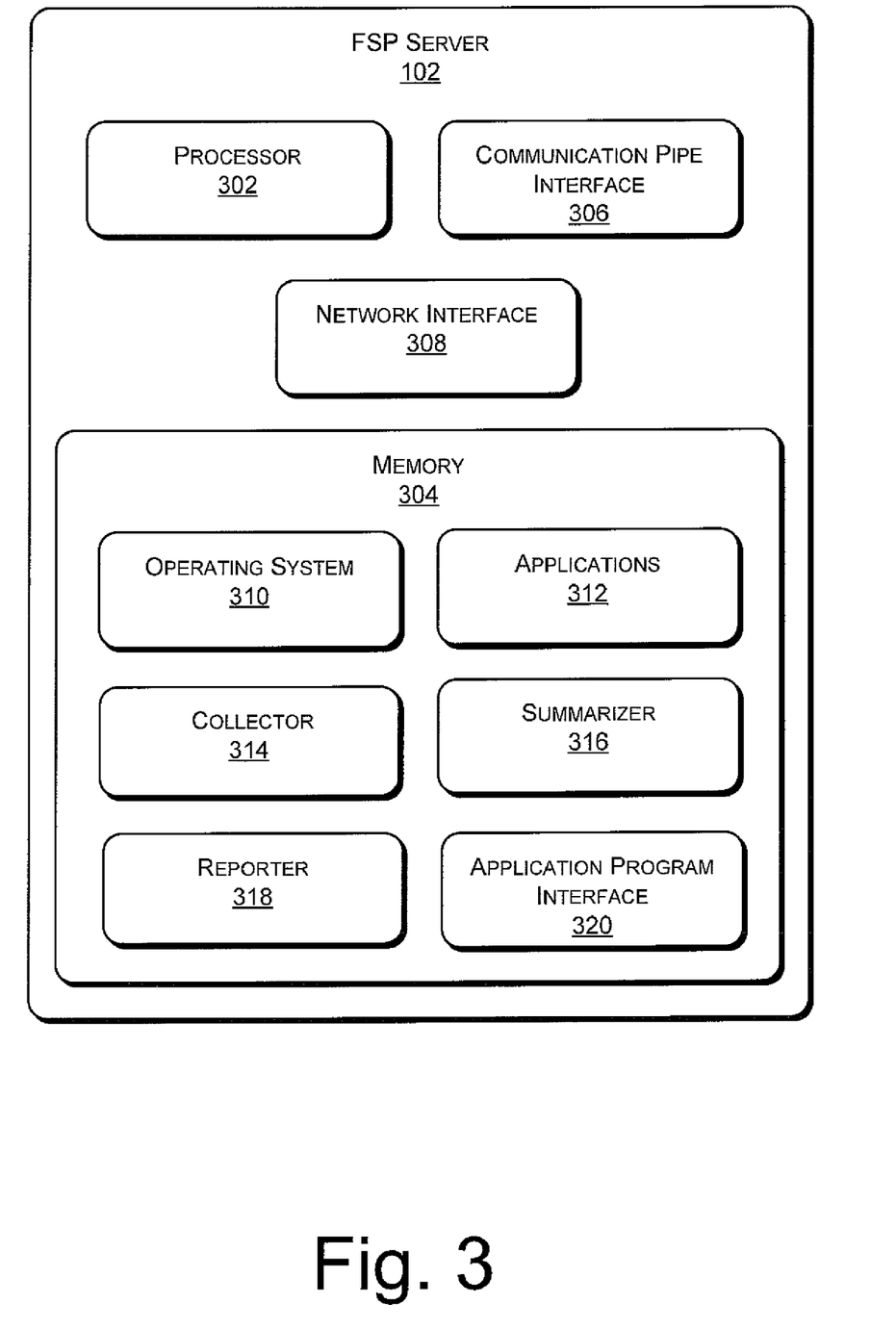
FIG. 3 is a block diagram illustrating an exemplary fallback status point (FSP) server.

FIG. 3 is a block diagram illustrating an exemplary FSP server 102. The FSP server 102 includes a processor 302 coupled to a memory 304, a communication pipe interface 306 and a network interface 308. The memory 304 includes computer-readable media in the form of volatile memory, such as Random Access Memory (RAM) and/or non-volatile memory, such as Read Only Memory (ROM) or flash RAM. Memory 304 typically includes data and/or program modules that are immediately accessible to and/or presently operated on by processor 302. In one embodiment, the memory 304 includes an operating system 310, applications 312, a collector 314, a summarizer 316, a reporter 318, and an application program interface 320.

The FSP server 102 may communicate with the resources 106 through the communication pipe interface 306 either directly or via network interface 308. In addition, the FSP server may communicate with the enterprise server 104 through the network interface 308.

The distress messages from resources 106 are received and stored by the collector 314. In addition, the collector 314 may also filter the distress messages to ensure that relevant messages get propagated to the enterprise server 104. For example, if a number of distress messages are received from the same resource within a short span of time, the collector 314 may retain the latest distress message from the same resource for further propagation.

The summarizer 316 summarizes the distress messages as per pre-defined formats or user-defined or application-defined formats and generates summarized messages. The summarized messages may be related to all the distress messages received from various resources 106, or the distress messages received from a particular resource, or any set of distress messages as specified by the enterprise server 104. The reporter 318 provides the summarized messages to the enterprise server 104. The reporter 318 may use the application program interface 320 to provide the summarized message to the enterprise server 104. In addition, the reporter 318 may propagate a maximum of a pre-determined number of distress messages within a certain period of time to ensure that the enterprise server 104 is not flooded with distress messages at any point of time.

Exemplary Methods

Exemplary methods for administering distress messages are described. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
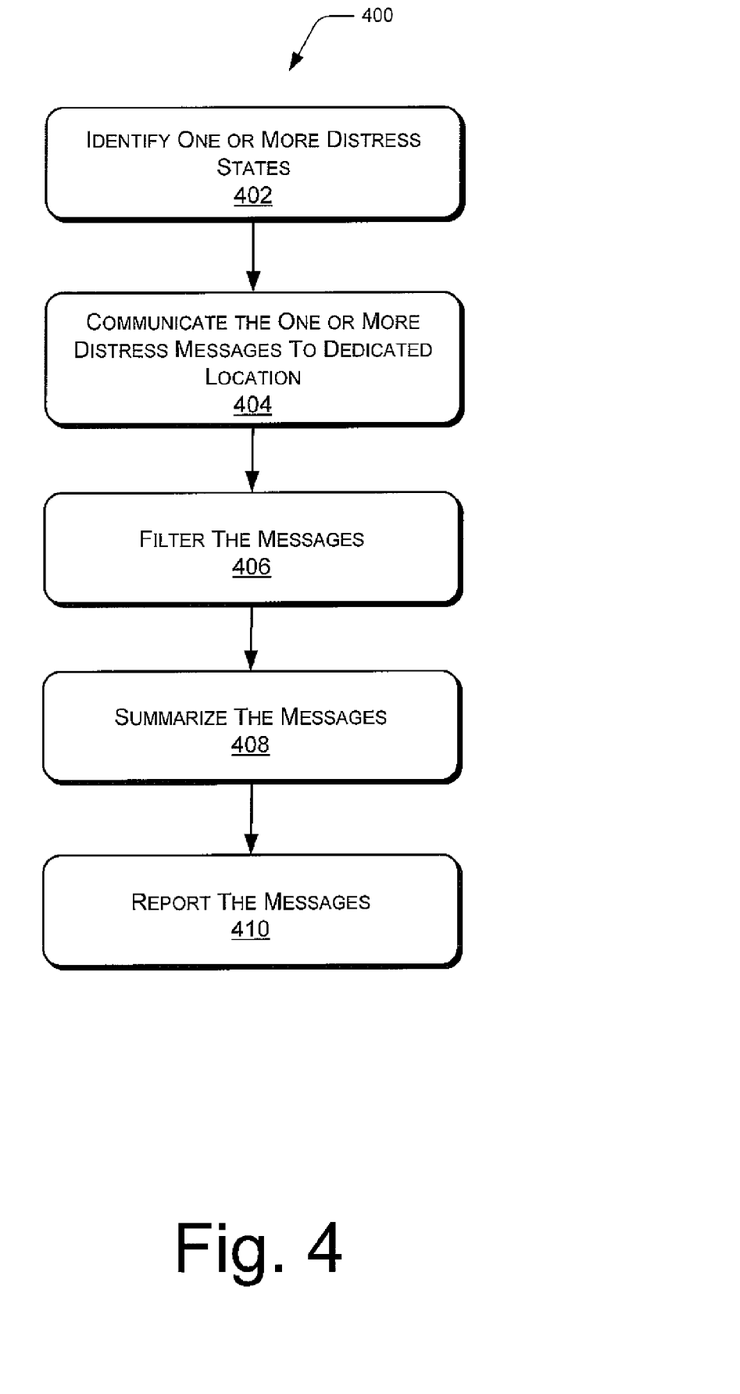
FIG. 4 is a flow diagram illustrating administering distress messages from resources.

FIG. 4 illustrates an exemplary method 400 for administering distress messages from resources. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, one or more distress states are identified at one or more resources. The identifying may be performed through an application program interface that communicates to one or more applications that are resident at the resources. The identifying may include the ability to send a multitude of information that allows an administrator to determine details of a problem, perform root cause analysis, and perform trend analysis across an enterprise. Furthermore, this may include providing ability for an application(s) to leverage the infrastructure to report service, health, and/or configuration issues (i.e., application independent).

At block 404, the identified distress messages are communicated to a dedicated location, such as a server. The communication between the resources and the dedicated location is through a communication pipe or channel. The location and the channel are continuously available to the resources. Furthermore, no other processes or infrastructure not needed for the communication is employed.

At block 406, the messages may be filtered based on predetermined formats or metrics, such most recent messages, number of messages received, etc. The filtering may be based on a predetermination set by a user at one or more locations, such as the dedicated location, or another central location.

At block 408, the messages are summarized. The summarization may be performed based on a predetermined format. The format may also be set by the user at one or more locations, such as the dedicated location, or another central location.

At block 410, the summarized messages may be reported. The reporting may be done for a predetermined number of messages and may be defined by a particular format.

Exemplary Computer Environment

Figure 5:
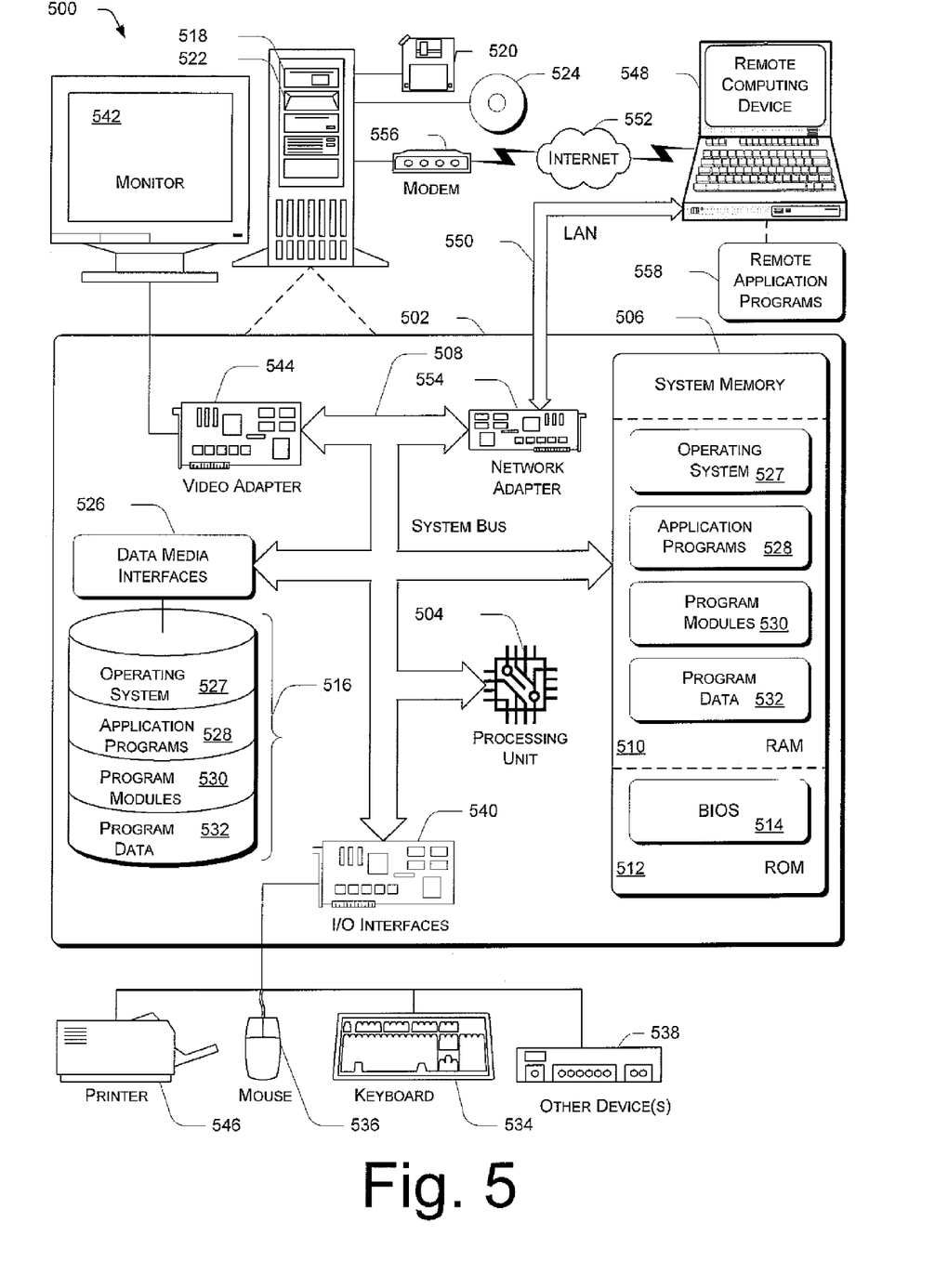
FIG. 5 illustrates an exemplary computing environment.

FIG. 5 illustrates an exemplary general computer environment 500, which can be used to implement the techniques described herein, and which may be representative, in whole or in part, of elements described herein. For example, the computer environment 500 may be an implementation of FSP server 102, enterprise server 104, and/or a resource 106. In certain embodiments, computer environment 500 can be a cellular telephone. Furthermore, particular elements described in computer environment 500 may be like or the same component as described above in reference to FIG. 2 and FIG. 3.

The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing-based device in the form of a computer 502. Computer 502 can be, for example, a desktop computer, a handheld computer, a notebook or laptop computer, a server computer, a game console, and so on. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternately, the hard disk drive 516S magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 527, one or more application programs 528, other program modules 530, and program data 532. Each of such operating system 527, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing-based device 548. By way of example, the remote computing-based device 548 can be a personal computer, portable computer, a server, a router, a network computer, a peer device or other common network node, and the like. The remote computing-based device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing-based device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

The above-described methods and system describe infrastructure to administer distress messages. Although the subject matter has been described in a language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A resource comprising:
a memory;
one or more processors operatively coupled to the memory; and
an interface component coupled to the memory, configured to provide an interface between the resource and a dedicated communication channel, wherein:
the dedicated communication channel provides for communicating, via one of a variety of communication protocols and independent from restrictions imposed by firewalls or other security measures, a distress message describing detailed issues relating to at least one application on the resource to a fallback status point (FSP) server that is continuously available to the resource;
the distress message is generated from a minimum reporting set that provides a library of generic messages that applies to and represents needs of a plurality of different applications configured to be executed on the resource, wherein the minimum reporting set helps one or more of the plurality of different applications generate a plurality of different distress messages in different communication formats; and
the FSP server is an intermediate server to a second server that deploys an agent, and the FSP server monitors and updates the resource, the FSP server being independent from the resource and the second server and the FSP server filtering a plurality of distress messages so that a subset of distress messages that are most recently received from the resource have priority for propagation to the second server over older distress messages received from the resource.

2. The resource of claim 1, wherein the interface component is a communication pipe interface and the dedicated communication channel is a communication pipe continuously available to the resource and the FSP server.

3. The resource of claim 1, wherein the dedicated communication channel uses a particular protocol of the variety of communication protocols at the resource and the FSP server, where the distress message is passed absent any other process or infrastructure.

4. The resource of claim 1, further comprising an application program interface to format and send the distress message.

5. The resource of claim 1, wherein the resource is one of the following: a cell phone, a personal digital assistant (PDA), a laptop computer, a desktop computer, or a mobile communication device.

6. A server comprising:
a memory;
one or more processors operatively coupled to the memory;
a collector included in the memory, and configured to receive a plurality of distress messages describing detailed issues relating to a plurality of agents deployed on a plurality of resources, wherein:
the plurality of distress messages are directly received from the plurality of resources through a plurality of continuously available communication pipes that implement one of a variety of communication protocols used to communicate the plurality of distress messages independent from restrictions imposed by firewalls or other security measures;
the server is a fallback status point (FSP) server that gathers the plurality of distress messages received and communicates with a second server that monitors and updates the plurality of resources; and
the collector filters the plurality of distress messages according to the respective resources, such that distress messages that are most recently received from a resource have priority for propagation to the second server over older distress messages received from the same resource;
a summarizer that summarizes respective portions of the filtered distress messages per a predefined format thereby providing a plurality of summarized distress messages; and
a reporter configured to send one or more of the plurality of summarized distress messages to the second server in accordance with a maximum number of distress messages the second server is configured to handle within a certain period of time.

7. The server of claim 6, wherein the second server defines the predefined format.

8. The server of claim 6, wherein the reporter sends the one or more of the plurality of summarized distress messages to the second server such that the second server provides appropriate action to mitigate one or more problems in the plurality of resources, wherein the one or more problems relate to a service, health, installation, communication, or configuration issue.

9. A method comprising:
receiving, via one of a variety of communication protocols and independent from restrictions imposed by firewalls or other security measures, a plurality of distress messages describing detailed issues relating to one or more deployed agents on one or more resources, wherein the plurality of distress messages are received at a dedicated network location that is separate from the one or more resources, the dedicated location being a fallback status point (FSP) server;
storing the plurality of distress messages received;
filtering, under control of a processor, the plurality of distress messages received so that recent distress messages received from the one or more resources have priority for propagation to the second server over older distress messages received from the one or more resources;
summarizing the recent distress messages according to a format determined by an enterprise server; and
relaying the summarized recent distress messages to an enterprise server in accordance with a maximum number of distress messages the enterprise server is configured to handle within a predetermined period of time.

10. The method of claim 9, wherein the detailed issues are identified to be associated with one or more applications resident at the one or more resources.

11. The method of claim 10, wherein any of the one or more applications can report service, health, installation, communication, or configuration problems.

12. The method of claim 9, wherein the plurality of distress messages allow an administrator to perform one or more of the following: determine problems at the one or more resources, root cause analysis, and trend analysis.

13. The method of claim 9, wherein the receiving is through a continuously available network communication channel connecting the one or more resources to the dedicated location.

* * * * *